US012664418B2

(12) United States Patent
Kusaka et al.

(10) Patent No.: US 12,664,418 B2
(45) Date of Patent: Jun. 23, 2026

(54) OPTICAL COMPUTATION DEVICE AND OPTICAL COMPUTATION METHOD

(71) Applicant: Fujikura Ltd., Tokyo (JP)

(72) Inventors: Hiroyuki Kusaka, Tokyo (JP);
Masahiro Kashiwagi, Tokyo (JP)

(73) Assignee: Fujikura Ltd., Tokyo (JP)

( * ) Notice: Subject to any disclaimer, the term of this patent is extended or adjusted under 35 U.S.C. 154(b) by 362 days.

(21) Appl. No.: 18/262,382

(22) PCT Filed: Jan. 14, 2022

(86) PCT No.: PCT/JP2022/001049
§ 371 (c)(1),
(2) Date: Jul. 21, 2023

(87) PCT Pub. No.: WO2022/176460
PCT Pub. Date: Aug. 25, 2022

(65) Prior Publication Data
US 2024/0078420 A1 Mar. 7, 2024

(30) Foreign Application Priority Data
Feb. 18, 2021 (JP) ................................. 2021-024504

(51) Int. Cl.
*G06N 3/067* (2006.01)
*G02B 5/18* (2006.01)
(52) U.S. Cl.
CPC ........... *G06N 3/067* (2013.01); *G02B 5/1819* (2013.01)

(58) Field of Classification Search
CPC ........ G06N 3/067; G02B 5/1819; G02B 5/18; G02B 5/1842; G02B 2005/1804; G02F 3/00
(Continued)

(56) References Cited

U.S. PATENT DOCUMENTS 4,764,890 A * 8/1988 Hinton ...................... G02F 3/00
708/801
5,528,720 A * 6/1996 Winston ............ G02F 1/133615
385/129
(Continued)

FOREIGN PATENT DOCUMENTS

JP H03-233433 A 10/1991
JP H08-262516 A 10/1996
(Continued)

OTHER PUBLICATIONS

Witten Opinion issued in corresponding International Application No. PCT/JP2022/001049 mailed Mar. 8, 2022 and International Preliminary Report on Patentablity mailed Aug. 22, 2023 (9 pages).
(Continued)

*Primary Examiner* — William R Alexander
*Assistant Examiner* — Mackenzi Bourquine
(74) *Attorney, Agent, or Firm* — Osha Bergman Watanabe & Burton LLP

(57) ABSTRACT
An optical computing device includes a light diffraction element group including light diffraction elements each having an optical computing function, and a light emitter that generates signal light inputted into the light diffraction element group and indicative of images formed by different optical systems.

6 Claims, 2 Drawing Sheets

(58) Field of Classification Search
USPC .......................................................... 708/801
See application file for complete search history.

(56) References Cited

U.S. PATENT DOCUMENTS

| | | | |
|---|---|---|---|
| 7,847,225 | B2 | 12/2010 | Yokoyama |
| 2006/0050391 | A1 | 3/2006 | Backlund et al. |
| 2009/0284489 | A1 | 11/2009 | Batchko |
| 2016/0238772 | A1* | 8/2016 | Waldern ............. G02B 27/0172 |

FOREIGN PATENT DOCUMENTS

| | | |
|---|---|---|
| JP | 2011-523538 A | 8/2011 |
| WO | 2019/186548 A1 | 10/2019 |
| WO | 2020/153504 A1 | 7/2020 |

OTHER PUBLICATIONS

International Search Report issued in corresponding International Application No. PCT/JP2022/001049 mailed Mar. 8, 2022 (3 pages).

* cited by examiner

MICROCELL

12ai

OPTICAL COMPUTATION DEVICE AND OPTICAL COMPUTATION METHOD

BACKGROUND

Technical Field

The present invention relates to an optical computing device and an optical computing method each of which performs optical computing with use of a light diffraction element.

Description of the Related Art

A light diffraction element has been known which includes a plurality of microcells and which is designed to optically carry out predetermined computing by causing signal light beams that have passed through the microcells to mutually interfere with each other. Optical computing carried out with use of a light diffraction element has an advantage of achieving higher speed and lower electric power consumption as compared with electrical computing carried out with use of a processor. Patent Literature 1 discloses an optical neural network having an input layer, an intermediate layer, and an output layer. The optical filter described above can be used as, for example, an intermediate layer of such an optical neural network.

PATENT LITERATURE

Patent Literature 1: U.S. Pat. No. 7,847,225

In a conventional optical computing device, optical computing is performed by inputting signal light indicative of a single image into a light diffraction element. Thus, it has been impossible to perform optical computing with use of information that cannot be obtained from only a single image, such as, for example, three-dimensional information on a subject.

SUMMARY

One or more embodiments provide an optical computing device and an optical computing method each of which can use, for optical computing, information that cannot be obtained from only a single image.

An optical computing device in accordance with one or more embodiments includes: a light diffraction element group including at least one light diffraction element having an optical computing function; and a light emitting section (example of a light emitter) configured to generate signal light that is inputted into the light diffraction element group and that is indicative of a plurality of images which have been formed by different optical systems.

An optical computing method in accordance with one or more embodiments is an optical computing method that uses a light diffraction element group including at least one light diffraction element having an optical computing function, the method including the step of: generating signal light that is inputted into the light diffraction element group and that is indicative of a plurality of images which have been formed by different optical systems.

According to one or more embodiments, it is possible to achieve an optical computing device or an optical computing method each of which can use, for optical computing, information that cannot be obtained from only an image which has been formed by a single camera.

DESCRIPTION OF THE EMBODIMENTS

Configuration of Optical Computing Device

Figure 1:
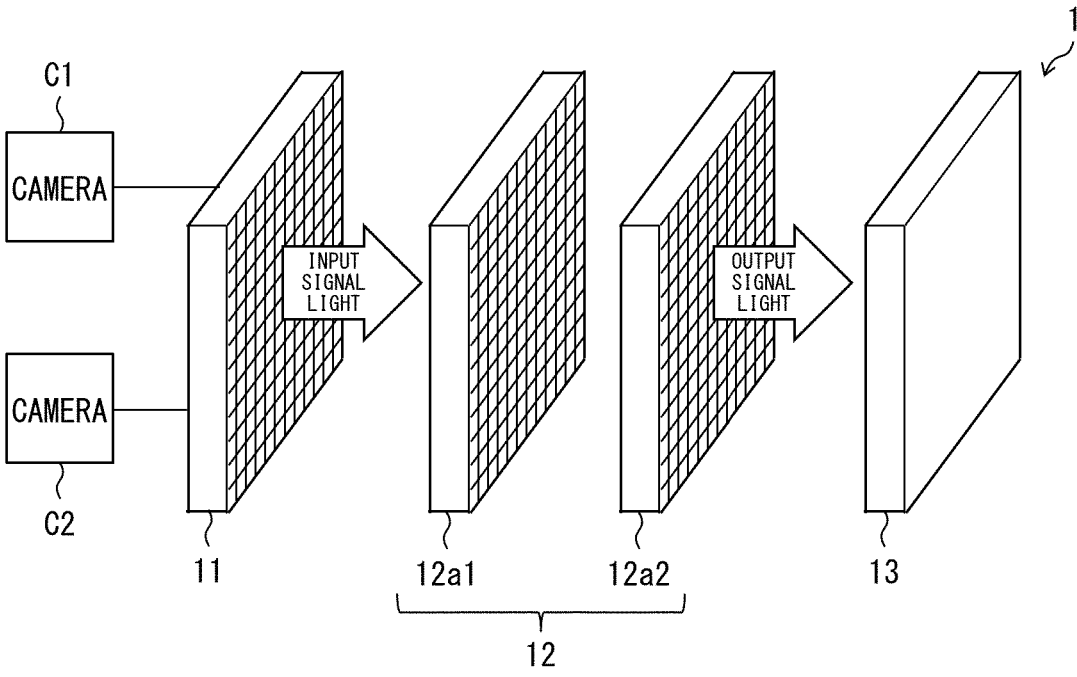
FIG. 1 is a perspective view illustrating a configuration of an optical computing device in accordance with one or more embodiments.

With reference to FIG. 1, the following will describe an optical computing device 1 in accordance with one or more embodiments. FIG. 1 is a perspective view illustrating a configuration of the optical computing device 1.

As illustrated in FIG. 1, the optical computing device 1 includes a light emitting section 11, a light diffraction element group 12, and a light receiving section 13.

The light emitting section 11 is configured to generate signal light. The signal light generated by the light emitting section 11 is signal light indicative of images which have been formed by two cameras C1 and C2. In one or more embodiments, used as the light emitting section 11 is a display that displays an image which has been formed by the camera C1 on a half (for example, a right half or upper half) of a screen and displays an image which has been formed by the camera C2 on the other half (for example, a left half or lower half) of the screen. Hereinafter, the signal light outputted from the light emitting section 11 is also referred to as "input signal light". Specific examples of the two images of which the input signal light is indicative will be described later.

The light diffraction element group 12 is arranged on a light path of the input signal light. The light diffraction element group 12 is a set of n light diffraction elements $12a1$ to $12an$. Here, n is a natural number that is not less than 1. Each light diffraction element $12ai$ is configured to perform predetermined optical computing. In other words, each light diffraction element $12ai$ is configured to convert a two-dimensional intensity distribution of signal light in accordance with a predetermined conversion rule. Here, i is a natural number that is not less than 1 and not more than n. In one or more embodiments, a set of two light diffraction elements $12a1$ and $12a2$ is used as the light diffraction element group 12. The configuration of the light diffraction element $12ai$ will be described later with reference to another drawing.

In the light diffraction element group 12, the light diffraction elements $12a1$ to $12an$ are arranged side by side in a straight line on the light path of the input signal light. Thus, the input signal light passes through a first light diffraction element $12a1$, a second light diffraction element $12a2$, . . . , and an n-th light diffraction element $12an$ in this order. Therefore, in the light diffraction element group 12, the input signal light is subjected to first optical computing performed by the first light diffraction element $12a1$, second optical computing performed by the second light diffraction element $12a2$, . . . , and n-th optical computing performed by the n-th light diffraction element $12an$, in this order. The intensity distribution of the signal light outputted from the light diffraction element group 12 shows computation results of these computing processes. Hereinafter, the signal light outputted from the light diffraction element group 12 is also referred to as "output signal light".

The light receiving section 13 is arranged on a light path of the output signal light. The light receiving section 13 is configured to detect the output signal light. In one or more embodiments, used as the light receiving section 13 is an image sensor configured to detect a two-dimensional intensity distribution of the output signal light.

Specific example of image of which input signal light is indicative.

A first specific example of two images of which the input signal light is indicative is two images that each contain, as a subject, one and the same target object and that are captured in different directions. In a case where a difference between the directions in which the two images are captured is small, these two images constitute a parallax image (for example, an image for a right eye and an image for a left eye). In this case, as the two cameras C1 and C2, for example, two cameras that constitute a stereo camera are used. In a case where the difference between the directions in which the two images are captured is large, these two images constitute a multi-angle image (for example, a front image and a side image). In this case, as the two cameras C1 and C2, for example, two cameras that constitute a multi-angle camera are used. This allows the light diffraction element group 12 to perform optical computing with use of information that cannot be obtained from only a single image, for example, three-dimensional information on a target object. In an autonomous driving technique, it is required in some cases to control an automobile with reference to three-dimensional information on an obstacle (target object). Thus, such an autonomous driving technique is a suitable application example of the present configuration.

A second specific example of the two images of which the input signal light is indicative is two images (for example, a wide-angle image and a telephoto image) that each contain, as a subject, one and the same target object and that are captured at different magnifications. In this case, as the two cameras C1 and C2, for example, a wide-angle camera and a telephoto camera are used. This makes it possible to perform optical computing with use of information that cannot be obtained from only a single image, for example, information concerning a whole of a target object contained in a wide-range image and information concerning a detail of the target object contained in a telephoto image. In the autonomous inspection technique, it is required in some cases to make a determination with reference to information concerning a whole of an inspection target (target object) and information concerning a detail of the inspection target. Thus, such an autonomous inspection technique is a suitable application example of the present configuration.

A third specific example of the two images of which the input signal light is indicative is two images (for example, a visible light image and an infrared light image) that each contain, as a subject, one and the same target object and that are captured at different wavelengths. In this case, as the two cameras C1 and C2, for example, a visible light camera and an infrared light camera are used. This makes it possible to perform optical computing with use of information that cannot be obtained from only a single image, for example, information concerning a shape of a target object contained in a visible light image and information concerning a temperature of the target object contained in an infrared light image. In a laser processing process monitoring technique, it is required in some cases to make a determination with reference to information concerning a shape of a workpiece (target object) and information concerning a temperature of the workpiece. Thus, such a laser processing process monitoring technique is a suitable application example of the present configuration.

Configuration of Light Diffraction Element

Figure 2:
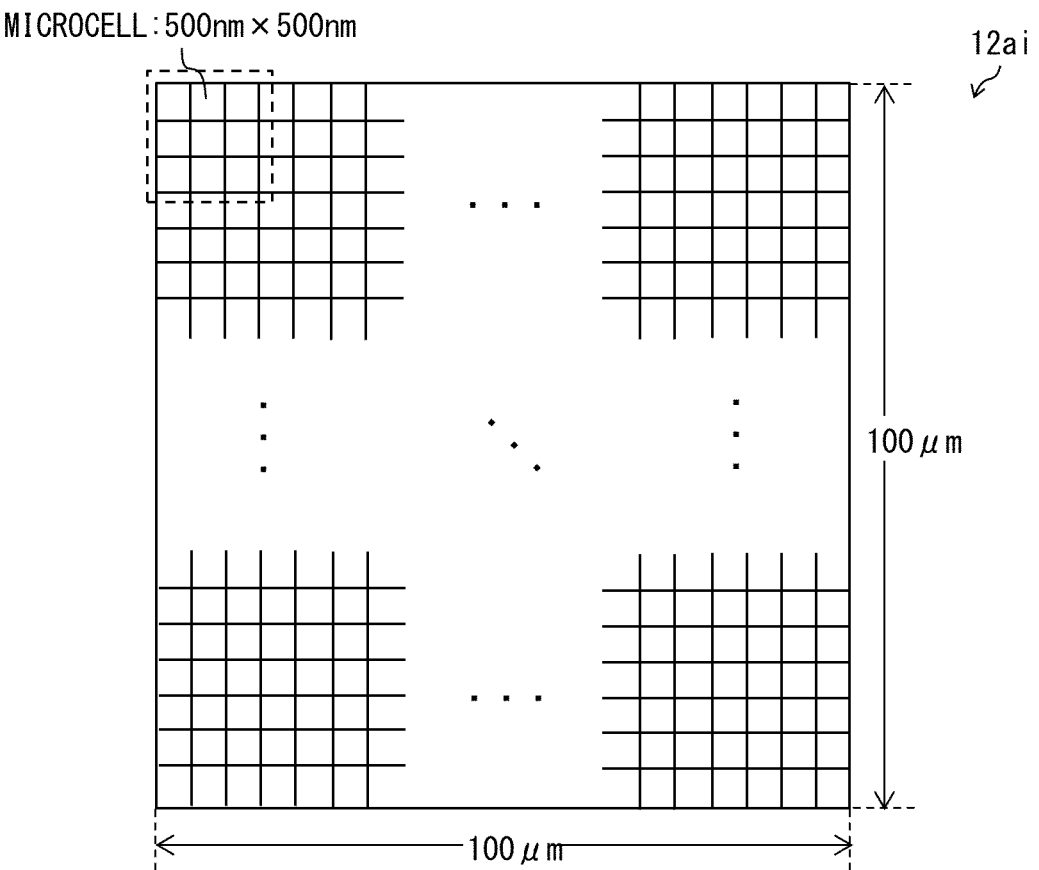
FIG. 2 is a plan view illustrating a configuration of a light diffraction element included in the optical computing device illustrated in FIG. 1.
Figure 3:
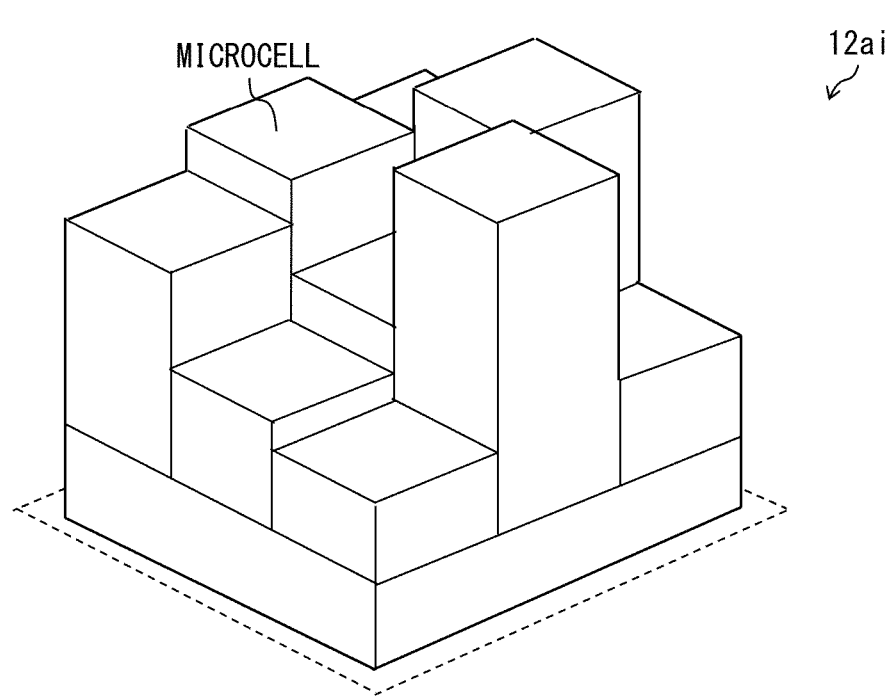
FIG. 3 is a perspective view illustrating an enlarged part of the light diffraction element illustrated in FIG. 2.

With reference to FIGS. 2 and 3, the following will describe a configuration of the light diffraction element 12$ai$. FIG. 2 is a plan view illustrating a configuration of the light diffraction element 12$ai$. FIG. 3 is a perspective view illustrating an enlarged part (part enclosed by a dotted line in FIG. 2) of the light diffraction element 12$ai$.

The light diffraction element 12$ai$ is constituted by a plurality of microcells having respective thicknesses or refractive indices that are set independently of each other. When signal light enters the light diffraction element 12$ai$, the signal light beams that have been diffracted in the respective microcells and that have different phases interfere with each other, so that predetermined optical computing (conversion of a two-dimensional intensity distribution in accordance with a predetermined conversion rule) is performed. Note that, in the present specification, the term "microcell" refers to, for example, a cell having a cell size of less than 10 μm. Further, in the present specification, the term "cell size" refers to a square root of an area of a cell. For example, in a case where a microcell has a square shape in plan view, the cell size is a length of one side of the cell. The cell size has a lower limit that is, for example, 1 nm.

The light diffraction element 12$ai$ illustrated in FIG. 2 is constituted by 200×200 microcells arranged in a matrix pattern. Each of the microcells has a square shape having a size of 500 nm×500 nm in plan view, and the light diffraction element 12$ai$ has a square shape having a size of 100 μm×100 μm in plan view.

A phase-shift amount of light that passes through a microcell can be set independently for each of the cells by (1) setting a thickness of the microcell independently for each of the cells or (2) setting a refractive index of the microcell independently for each of the cells. One or more embodiments employ the method (1), which can be performed through nanoimprinting. In this case, as illustrated in FIG. 3, each of the microcells is constituted by a pillar that has a quadrangular prism shape and that has a square bottom surface which has sides each having a length equal to a cell size. In this case, a phase-shift amount of light that passes through a microcell is determined in accordance with a height of the pillar. That is, the light that passes through the microcell which is constituted by a high pillar has a large phase-shift amount, and the light that passes through the microcell which is constituted by a low pillar has a small phase-shift amount.

Note that the thickness or refractive index of each of the microcells can be set, for example, through machine learning. A model used in this machine learning can be, for example, a model in which a two-dimensional intensity distribution of signal light inputted into the light diffraction element 12$ai$ is an input, and a two-dimensional intensity distribution of signal light outputted from the light diffraction element 12$ai$ is an output and which includes a thickness or refractive index of each of the microcells as a parameter. Here, the two-dimensional intensity distribution of the signal light inputted into the light diffraction element 12$ai$ means a set of intensities of signal light beams inputted into the respective microcells that constitute the light diffraction element 12$ai$. Further, the two-dimensional intensity distribution of the signal light outputted from the light diffraction element 12$ai$ means: a set of intensities of signal light beams inputted into respective microcells that constitute a light diffraction element 12$ai$+1 arranged so as to follow the light diffraction element 12*ai*; or a set of intensities of signal light beams inputted into respective microcells that constitute the light receiving section 13 arranged so as to follow the light diffraction element 12*ai*.

Variation of Optical Computation Device

One or more embodiments employ the configuration such that input signal light indicative of two images is used as input signal light, but the present invention is not limited to this. That is, a configuration may be employed such that input signal light indicative of three or more images is used as the input signal light.

Further, one or more embodiments employ the configuration such that the camera is used as the optical system for forming an image, but the present invention is not limited to this. That is, an optical system other than the camera can be used as the optical system for forming an image. In this case, the light emitting section 11 is constituted by a plurality of optical systems for guiding, to the light diffraction element group 12, light from a target object. The light emitting section 11 can be constituted by, for example, a first optical system (including, for example, a lens and a mirror) for guiding, to the light diffraction element group 12, light emitted from a target object in a first direction and a second optical system (including, for example, a lens and a mirror) for guiding, to the light diffraction element group 12, light emitted from the target object in a second direction.

Aspects of one or more embodiments can also be expressed as follows:

An optical computing device according to Aspect 1 of one or more embodiments includes: a light diffraction element group including at least one light diffraction element having an optical computing function; and a light emitting section configured to generate signal light that is inputted into the light diffraction element group and that is indicative of a plurality of images which have been formed by different optical systems.

According to the above configuration, it is possible to use, for optical computing, information that cannot be obtained from only a single image.

An optical computing device according to Aspect 2 of one or more embodiments employs, in addition to the configuration of the optical computing device according to Aspect 1, a configuration such that the light emitting section is configured to generate signal light indicative of a plurality of images which have been formed by different cameras.

According to the above configuration, it is possible to use, for optical computing, information that cannot be obtained from only an image which has been formed by a single camera.

An optical computing device according to Aspect 3 of one or more embodiments employs, in addition to the configuration of the optical computing device according to Aspect 2, a configuration such that the plurality of images are images that each contain, as a subject, one and the same target object and that are captured in different directions.

According to the above configuration, it is possible to use, for optical computing, three-dimensional information on a target object.

An optical computing device according to Aspect 4 of one or more embodiments employs, in addition to the configuration of the optical computing device according to Aspect 2, a configuration such that the plurality of images are images that each contain, as a subject, one and the same target object and that are captured at different magnifications.

According to the above configuration, it is possible to use, for example, information concerning a whole of a target object and information concerning a detail of the target object, for optical computing.

An optical computing device according to Aspect 5 of one or more embodiments employs, in addition to the configuration of the optical computing device according to Aspect 2, a configuration such that the plurality of images are images that each contain, as a subject, one and the same target object and that are captured at different wavelengths.

According to the above configuration, it is possible to use, for example, information concerning an appearance of a target object and information concerning a temperature of the target object, for optical computing.

An optical computing device according to Aspect 6 of one or more embodiments employs, in addition to the configuration of the optical computing device according to any one of Aspects 1 to 5, a configuration such that the light diffraction element is constituted by a plurality of microcells that have respective thicknesses or refractive indices set independently of each other.

According to the above configuration, it is possible to easily manufacture a light diffraction element with use of, for example, a nanoimprinting technique.

An optical computing method in accordance with Aspect 7 of one or more embodiments is an optical computing method that uses a light diffraction element group including at least one light diffraction element having an optical computing function, the method including the step of: generating signal light that is inputted into the light diffraction element group and that is indicative of a plurality of images which have been formed by different optical systems.

According to the above configuration, it is possible to use, for optical computing, information that cannot be obtained from only an image which has been formed by a single camera.

Additional Remarks Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Optical computing device
11 Light emitting section
12 Light diffraction element group
12*a*1, 12*a*2 Light diffraction element
13 Light receiving section
C1, C2 camera

The invention claimed is:

1. An optical computing device comprising:
a light diffraction element group including light diffraction elements each having an optical computing function; and
a light emitter that generates signal light:
inputted into the light diffraction element group, and
indicative of images formed by different optical systems, wherein
each of the light diffraction elements is constituted by microcells that have respective thicknesses or refractive indices set independently of each other such that each of the light diffraction elements performs predetermined optical computing, and
beams of the signal light diffracted in the microcells interfere with each other.

2. The optical computing device according to claim 1 further comprising two cameras that form the images.

3. The optical computing device according to claim 2, wherein the images each contain, as a subject, an identical target object and are captured in different directions.

4. The optical computing device according to claim 2, wherein the images each contain, as a subject, an identical target object and are captured at different magnifications.

5. The optical computing device according to claim 2, wherein the images each contain, as a subject, an identical target object and are captured at different wavelengths.

6. An optical computing method comprising:

generating signal light inputted into a light diffraction element group and indicative of images formed by different optical systems;

causing the signal light to enter the light diffraction element group constituted by microcells; and causing beams of the signal light diffracted in the micro-cells to interfere with each other, wherein the optical computing method uses the light diffraction element group including light diffraction elements each having an optical computing function, and each of the light diffraction elements is constituted by the microcells that have respective thicknesses or refractive indices set independently of each other such that each of the light diffraction elements performs predetermined optical computing.

\* \* \* \* \*